United States Patent
Marcell

[11] 3,913,232
[45] Oct. 21, 1975

[54] MEASURING DEVICE
[76] Inventor: William B. Marcell, 3950 NW. 36 Terrace, Fort Lauderdale, Fla. 33309
[22] Filed: May 1, 1974
[21] Appl. No.: 465,916

[52] U.S. Cl. .............................. 33/107 R; 33/137 R
[51] Int. Cl.² ........................ B43L 7/00; G01B 3/04
[58] Field of Search ............ 33/107, 111, 137, 106, 33/161, 138, 139

[56] References Cited
UNITED STATES PATENTS

| | | | |
|---|---|---|---|
| 1,186,853 | 6/1916 | Smith | 33/107 R |
| 1,529,210 | 3/1925 | Parker | 33/107 R |
| 1,623,138 | 4/1927 | Swift | 33/137 R |
| 1,646,826 | 10/1927 | Langsner | 33/137 R |
| 2,466,405 | 4/1949 | Fowler | 33/137 R |
| 2,629,934 | 3/1953 | Scott | 33/137 R |
| 2,857,678 | 10/1958 | Armour | 33/343 |

FOREIGN PATENTS OR APPLICATIONS
894,774  4/1962  United Kingdom .............. 33/137 R

*Primary Examiner*—Harry N. Haroian

[57] ABSTRACT

A rigid measuring device provided with a rotatable or slidable tab at its distal end with a downwardly dependent portion on the tab providing means to engage, without dislocation by random events, a thin-walled object to be measured.

2 Claims, 10 Drawing Figures

U.S. Patent  Oct. 21, 1975  3,913,232
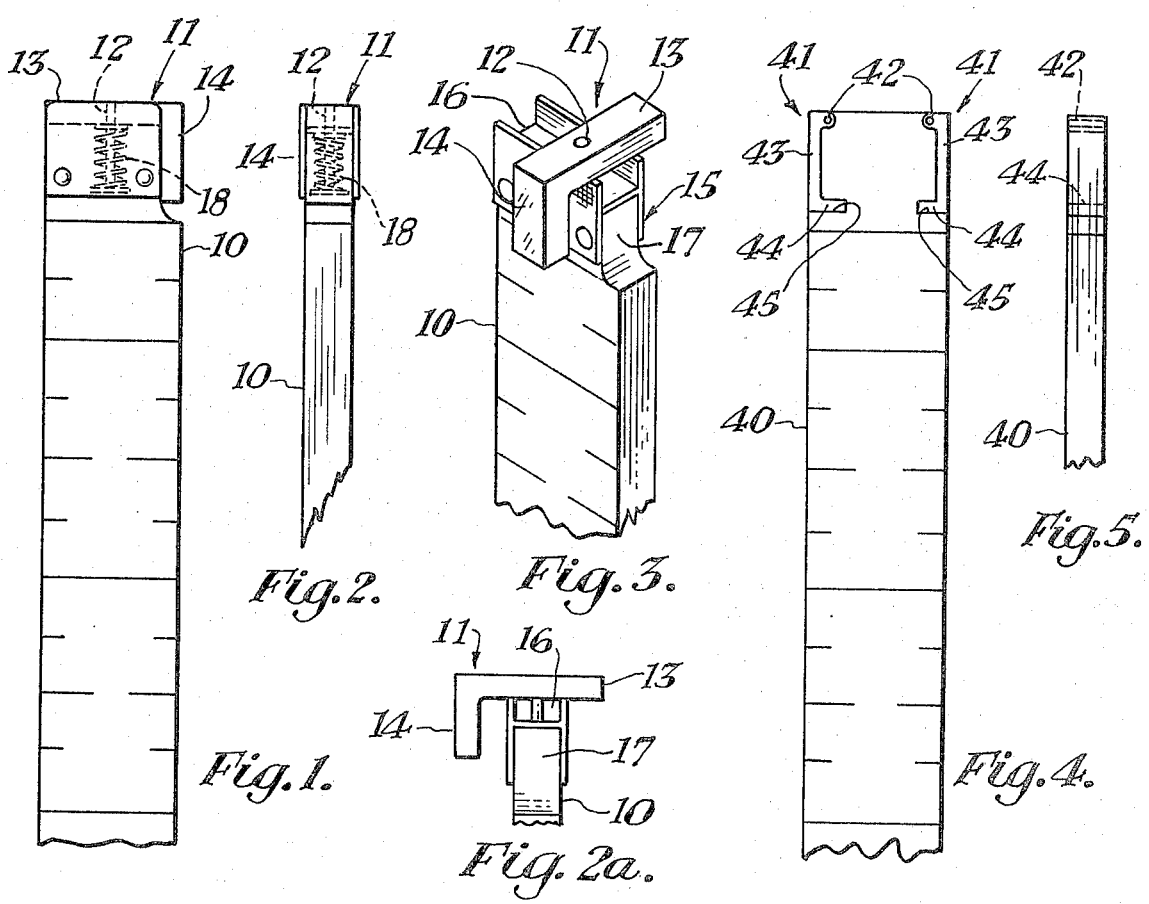
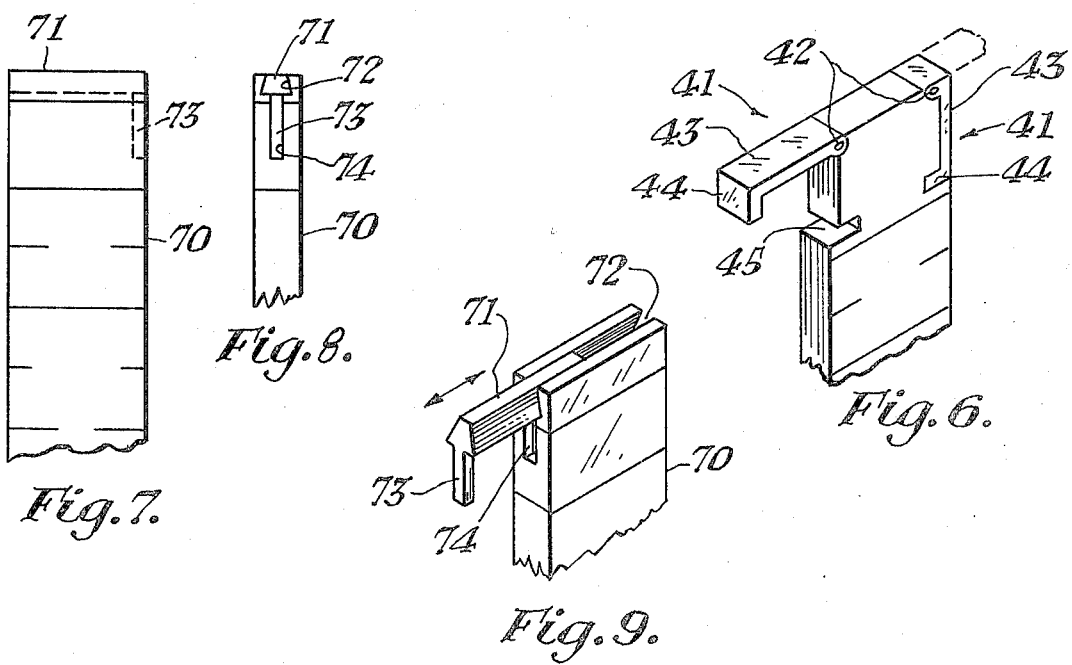

MEASURING DEVICE

This invention is directed to means for securing a measuring device in a fixed position with an object to be measured, such as a piece of pipe or electrical conduit, so that accurate measurement can be effected by a single operator without inadvertent disengagement of the measuring device from the article being measured while the measurement is being performed. This invention is directed specifically to measuring devices of a rigid type in contrast with flexible or tape types of measuring devices.

THE PRIOR ART

Rigid measuring devices have been used by artisans for centuries. Typical of the art at the date of the filing of this application is Lufkin Tape and Rule Catalog No. 106. Typical of prior art devices of the rigid type is Lufkin Model HO66, appearing on page 44 of the catalog, or Model 524, shown on page 53. Each of these includes a folding hook which rotates through an arc of 90° from a rest position, in which the hook is in contact with the rule, to an extended position, in which the hook is disposed at an angle of 90° to the rule. This device is not efficacious where a single artisan is measuring an object of dimensions greater than the span of the spread of his two arms as there is no assured means for the continuous engagement of the hook with the distal end of the object being measured. Thus, in the measurement of lengthy objects, such as a 2 × 12 × 20 foot plank, the services of at least two artisans would be required.

ADVANTAGES OVER THE PRIOR ART

My device, shown in three forms, and more particularly described in the next section of this specification, has the advantages that it provides a more secure connection with the distal end of the article to be measured and yet, when not in use, is snugly secured within a recess of the end of the measuring device and out of the way. What is presently thought to be its best and highest use is for plumbers or electricians who are continuously confronted with the problem of measuring conduit or pipe before cutting it to the length required and with means such as are here shown for securing the distal end of the rigid measuring device to the conduit or pipe to be measured, the services of two workmen would be required. In the instance of the invention of this specification, a measurement can be effectively and quickly performed by but one artisan.

DESCRIPTION OF THE DEVICE

Referring now to the drawings:

FIG. 1 is a plan view of one form of my invention;

FIG. 2 is a side elevation thereof;

FIG. 2a is a side elevation, similar to FIG. 2, except that the tab is rotated 90° to the operative position;

FIG. 3 is a perspective view thereof shown ready for engagement with an object to be measured;

FIG. 4 is a plan view of another form of my device;

FIG. 5 is a side elevational view thereof;

FIG. 6 is a perspective view showing one of the tabs of the device distended ready for engagement with an object to be measured;

FIG. 7 is a plan view of still another form of my device;

FIG. 8 is a side elevational view thereof;

FIG. 9 is a perspective view showing the tab of this form of the device distended ready for engagement with an object to be measured;

Referring now particularly to FIGS. 1, 2, 2a and 3, 10 is a rigid measuring device having rotatable tab 11 mounted on a pivot 12 at the distal end of the measuring device 10. The tab has an arm 13, positioned parallel to the distal end of the measuring device 10, and a downwardly dependent portion 14. In order that the measurement may be true when the device is in use, the distal end of the measuring device 10 is fitted with a double channelled structure 15, the upper channel of which 16, provides a recess in which the tab 11 is lodged, when the device is not in use, being held snugly in its rest position by the spring 18. To use the device, the tab 11 is lifted against the force of the spring from the channel 16 and is rotated 90° to the operating position shown in FIGS. 2a and 3. In this position, the downwardly dependent portion 14 forms a space with the outer surface of the double channel structure 15 which can engage the rim of an object, such as a conduit or pipe, and the inner surface of the tab 11 being held against the distal edges of the double channel structure 15 by the force of the spring 18 permits an accurate measurement.

In the alternative type illustrated in FIGS. 4-6, I provide a rigid measuring device 40 at the distal end of which tabs 41—41 are pivoted on pivots 42—42 adapted to be swung outwardly from the narrow edge of the measuring device 10. Each of the pivotal tabs has an arm 43—43 with a dependent portion 44—44. The dependent portions 44—44 fit into the recesses 45—45 when the device is at rest. When the device is in the operable position as shown in FIG. 6, the dependent portion 44—44 of the tab 41—41 lies parallel to the narrow surface of the rigid measuring device 10 to engage the edge of a hollow article to be measured.

In the second alternative form of the device illustrated in FIGS. 7-9, I provide a rigid measuring device 70 having a tab 71, carried in a slot 72 at the distal end of the device. The tab 71 has a dependent portion 72, the axis of which in operable position is parallel to the narrow surface of the rigid measuring device 10, when distended as shown by the arrow in FIG. 9. When in the rest position, the dependent portion 73 of the tab 71 fits into the recess 74 in the wall of the rigid measuring device 10. When extended as in FIG. 9, the distal end of the measuring device is adapted to engage the wall of an object, such as electrical conduit or pipe, to be measured.

It is to be noted that in respect of the alternative types shown in FIGS. 4-9, the measurements are not true as in the case of the type shown in FIGS. 1, 2, 2a and 3, by reason of the width of the tab 41, FIGS. 4-6, or the tab 71, FIGS. 7-9.

Having fully described the three alternative forms of my device, I claim:

1. A measuring device having a distal end and a proximal end and being calibrated for linear measurement between said ends, spring mounted means on the distal end of the device, rotatable about the linear axis of the device, and movable upwardly into an operating position, and a tab, depending downwardly from said spring mounted means and parallel to the axis of said device but spaced from a surface thereof when rotated through an arc of 90°.

2. A measuring device in accordance with claim 1 in which a channel is mounted on the distal end of the device which said channel serves as a recess for the means mounted on the distal end of the device when it is at rest and as a spacer when said means are rotated to an operative position to provide an exact linear measurement from the distal end of the device to the point at which the measurement is being taken.

* * * * *